United States Patent

Asakura et al.

[11] Patent Number: 5,815,367
[45] Date of Patent: Sep. 29, 1998

[54] LAYERED CAPACITORS HAVING AN INTERNAL INDUCTOR ELEMENT

[75] Inventors: Kyoshin Asakura, Sabae; Shozo Takeuchi, Fukui, both of Japan

[73] Assignee: Murata Manufacturing Co., Ltd., Japan

[21] Appl. No.: 815,279

[22] Filed: Mar. 10, 1997

[30] Foreign Application Priority Data

Mar. 11, 1996 [JP] Japan .................................... 8-083249
Jun. 27, 1996 [JP] Japan .................................... 8-166994

[51] Int. Cl.⁶ .................................................. H01G 4/005
[52] U.S. Cl. .................. 361/303; 361/306.1; 361/308.1; 361/310; 361/313; 333/186; 338/312
[58] Field of Search .................................... 361/303, 313, 361/321.1, 321.2, 321.3, 321.4, 321.5, 308.1, 306.1, 766, 782, 821, 811, 310; 333/172, 176, 178, 185; 174/52.6; 338/204, 264, 266, 277, 306, 307, 308, 309, 310, 311–313, 318, 332

[56] References Cited

U.S. PATENT DOCUMENTS

| | | | |
|---|---|---|---|
| 4,573,101 | 2/1986 | Takeno .................................. | 361/321.1 |
| 4,665,465 | 5/1987 | Tanabe .................................. | 361/306 |
| 5,051,712 | 9/1991 | Naito et al. .............................. | 333/185 |
| 5,420,553 | 5/1995 | Sakamoto et al. ....................... | 333/172 |
| 5,561,586 | 10/1996 | Tomohiro et al. ...................... | 361/303 |

Primary Examiner—Kristine L. Kincaid
Assistant Examiner—Anthony Dinkins
Attorney, Agent, or Firm—Ostrolenk, Faber, Gerb & Soffen, LLP

[57] ABSTRACT

Multi-terminal, layered capacitors having excellent attenuation characteristics over a wide frequency range. A four-terminal, layered capacitor has a dielectric sheet with an internal inductor electrode connecting an external input terminal to an external output terminal, dielectric sheets with internal capacitor electrodes connected to the external input terminal, and internal capacitor electrodes connected to the external output terminal, and dielectric sheets with internal ground electrodes connected to external ground terminals. All these dielectric sheets are integrally stacked and calcined to form a one-piece structure.

8 Claims, 9 Drawing Sheets

LAYERED CAPACITORS HAVING AN INTERNAL INDUCTOR ELEMENT

BACKGROUND OF THE INVENTION

1. Technical Field of the Invention

The present invention relates generally to layered capacitors and, more particularly, to multi-terminal layered capacitors and noise-absorbing layered ceramic capacitors which are used for reducing or eliminating electrical noise in electronic apparatus, for instance.

2. Description of the Related Art

Figure 8:
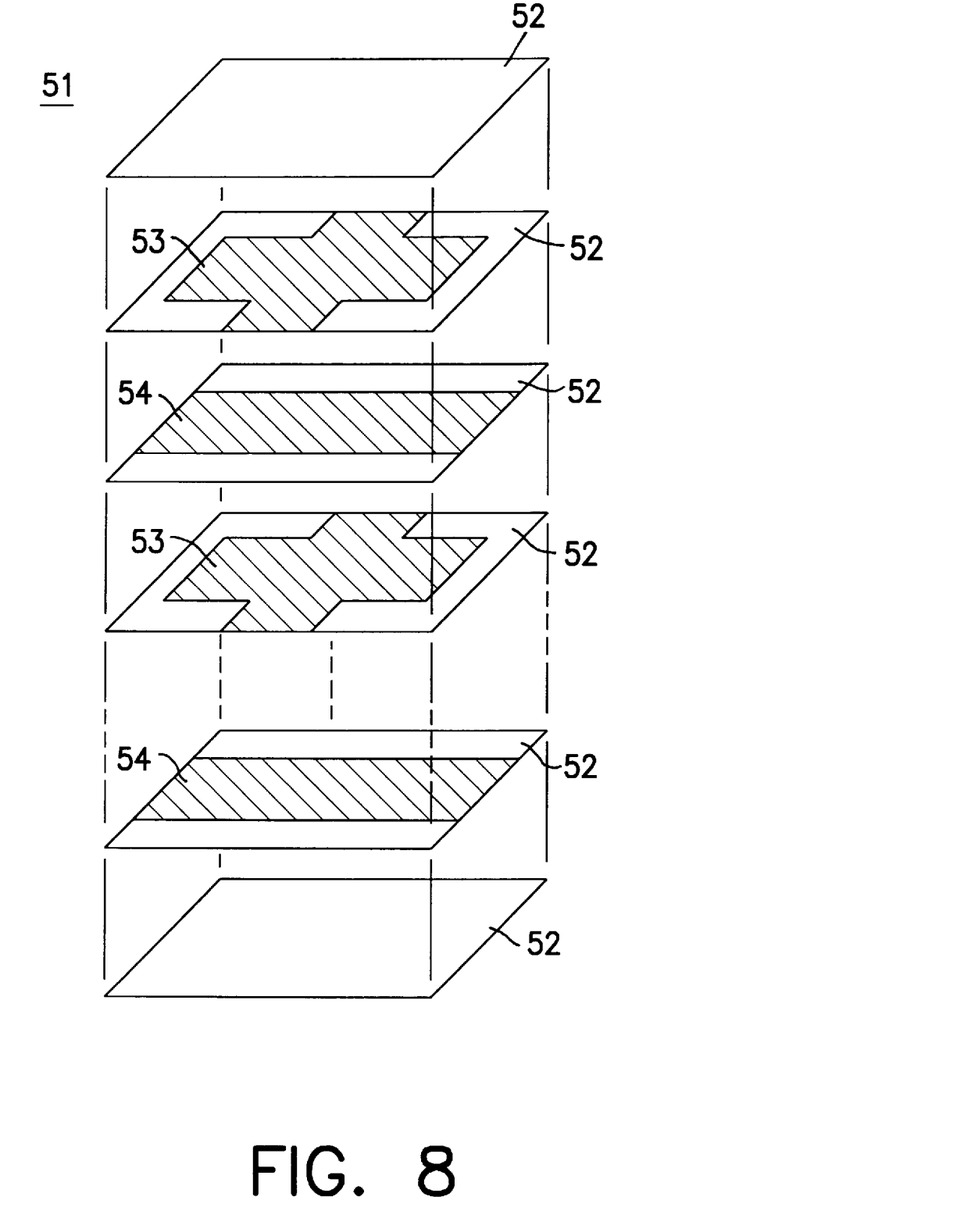
FIG. 8 is an exploded perspective view of a conventional four-terminal, layered capacitor.

Two-terminal and four-terminal, layered capacitors are commonly used for reducing or eliminating electrical noise in various electronic apparatus. As shown in FIG. 8, a conventional four-terminal, layered capacitor 51 comprises dielectric sheets 52 carrying internal ground electrodes 53 on their surfaces, dielectric sheets 52 carrying internal capacitor electrodes 54 on their surfaces, and outermost protective dielectric sheets 52.

Figure 9:
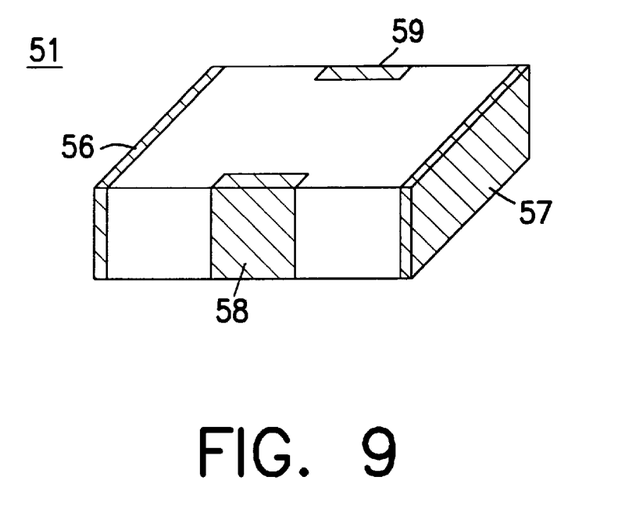
FIG. 9 is a perspective view showing the external appearance of the four-terminal, layered capacitor shown in FIG. 8.
Figure 10:
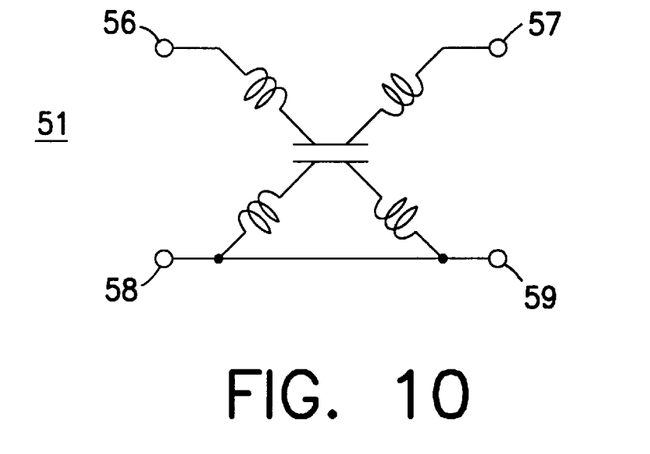
FIG. 10 is an equivalent circuit of the four-terminal, layered capacitor shown in FIG. 9.

The individual dielectric sheets 52 are stacked one on top of another and calcined as a whole to form the capacitor 51 shown in FIG. 9. An external input terminal 56 and external output terminal 57 are formed at opposite end faces of the capacitor 51 while a pair of external ground terminals 58 and 59 are formed at its front and rear end faces, respectively, as illustrated in FIG. 9. FIG. 10 is an equivalent circuit of the capacitor 51. A four-terminal, layered capacitor 51 of this kind has a higher resonant frequency than conventional two-terminal, layered capacitors of the type having a plurality of internal electrodes on respective dielectric layers which are connected alternately to respective input and output end electrodes. Also, in general they provide high attenuation in a high-frequency range.

Although the conventional four-terminal, layered capacitors 51 generally offer high attenuation factors at high frequencies, the amount of attenuation they achieve is lower than that of two-terminal, layered capacitors around the resonant frequencies of the two-terminal, layered capacitors.

SUMMARY OF THE INVENTION

The invention provides multi-terminal, layered capacitors having excellent, improved attenuation characteristics even at resonant frequencies of the known two-terminal, layered capacitors while maintaining a high attenuation capability in high-frequency ranges.

To achieve this, a multi-terminal, layered LC capacitor according to an aspect of the invention comprises a first internal capacitor electrode electrically connected to an external input terminal, a second internal capacitor electrode electrically connected to an external output terminal, an internal ground electrode electrically connected to an external ground terminal to produce a capacitance between the first internal capacitor electrode and the internal ground electrode and another capacitance between the second internal capacitor electrode and the internal ground electrode, and an internal inductor electrode electrically connected between the external input terminal and the external output terminal.

Provided with the internal inductor electrode, first and second internal capacitor electrodes and internal ground electrode, the aforementioned multi-terminal, layered capacitor of the invention forms a circuit configured with two separate capacitor elements and an inductor element. The layered capacitor thus constructed provides a lower resonant frequency than the conventional four-terminal, layered capacitors while maintaining a high-frequency attenuation capability comparable to the latter. As a result, it becomes possible to produce a four-terminal, layered capacitor featuring excellent attenuation characteristics over a wide frequency range.

A noise-absorbing, ceramic layered capacitor according to a second aspect of the invention comprises a plurality of internal electrodes embedded in a ceramic body, the internal electrodes including capacitor element patterns arranged in such a way that a plurality of capacitor elements are formed and inductor element patterns forming inductor elements, whereby a circuit in which the capacitor elements are connected in parallel with one another by the inductor elements in a plurality of stages is formed.

Preferably the plurality of capacitor elements provide different values of capacitance in the above noise-absorbing, ceramic layered capacitor of the invention. Thus, it is possible to absorb electrical noise in specific frequency bands corresponding to the respective values of capacitance of the capacitor elements. It is therefore apparent that this noise-absorbing, ceramic layered capacitor provides desired noise-absorbing performance even when the electrical noise is present in a plurality of frequency bands.

Furthermore, the necessary noise-absorbing performance is obtainable without increasing the number of components since the individual capacitor elements and inductor elements of the noise-absorbing, ceramic layered capacitor of the invention are integrally stacked into a one-piece structure.

Other features and advantages of the present invention will become apparent from the following description of the invention which refers to the accompanying drawings.

DETAILED DESCRIPTION OF EMBODIMENTS OF THE INVENTION

Multi-terminal, layered capacitors according to embodiments of the invention are now described in detail with reference to the accompanying drawings, in which like elements and assemblies are designated by like reference numbers.

FIRST EMBODIMENT

Figure 1:
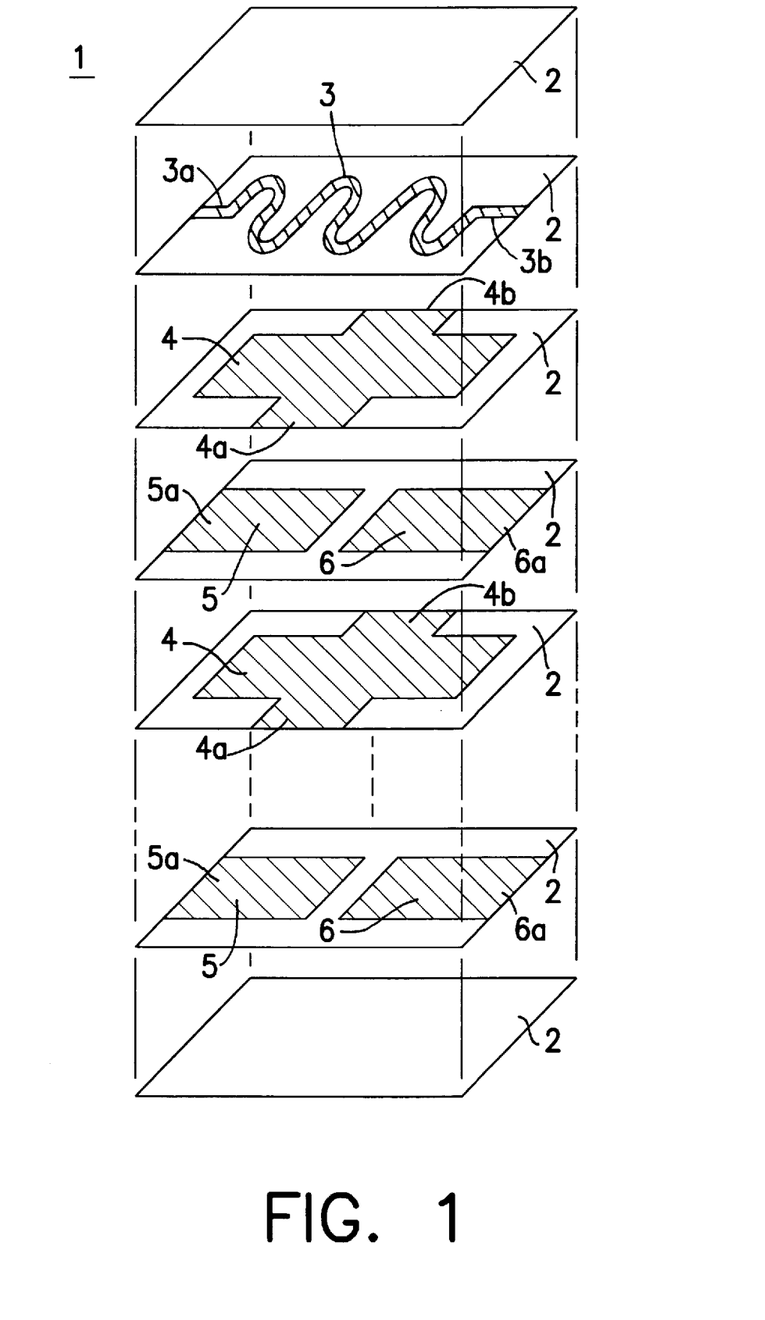
FIG. 1 is an exploded perspective view of a four-terminal, layered capacitor according to a first embodiment of the invention.

As shown in FIG. 1, a four-terminal, layered capacitor 1 of a first embodiment comprises a dielectric sheet 2 carrying an internal inductor electrode 3 on its surface, dielectric sheets 2 carrying internal ground electrodes 4 on their surfaces, dielectric sheets 2 carrying internal capacitor electrodes 5 and 6 on their surfaces, and outermost protective dielectric sheets 2. Each dielectric sheet 2 is made of a ceramic material, for example.

The internal inductor electrode 3 is generally patterned to form a sinuous shape with its extreme left segment 3a and extreme right segment 3b exposed at left and right edges of the dielectric sheet 2, respectively. The internal capacitor electrodes 5 are located on the left side of the individual dielectric sheets 2 with extreme left ends 5a of the internal capacitor electrodes 5 exposed at left edges of the dielectric sheets 2, while the internal capacitor electrodes 6 are located on the right side of the individual dielectric sheets 2 with extreme right ends 6a of the internal capacitor electrodes 6 exposed at right edges of the dielectric sheets 2. The electrodes 3 to 6 are layers of silver (Ag), silver-palladium alloy (Ag-Pd) or Nickel (Ni), for example, formed by using a technique such as printing, sputtering or vacuum evaporation.

Figure 2:
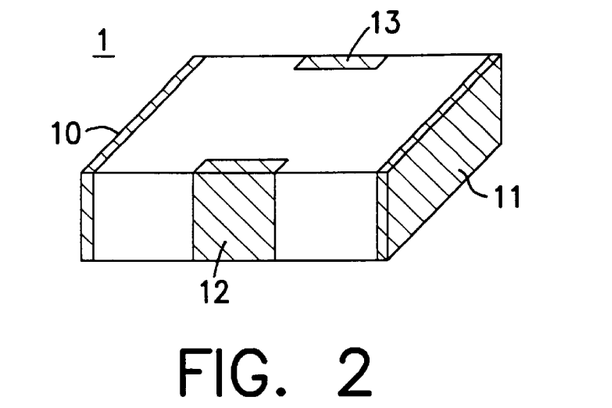
FIG. 2 is a perspective view showing the external appearance of the four-terminal, layered capacitor shown in FIG. 1.

All the dielectric sheets 2 are stacked in the order shown in FIG. 1, and calcined to form a single laminated body. As illustrated in FIG. 2, an external input terminal 10 and external output terminal 11 are formed at left and right end faces of the laminated body while a pair of external ground terminals 12 and 13 are formed at front and rear end faces, respectively. The external input terminal 10 is electrically connected to the extreme left segment 3a of the internal inductor electrode 3 as well as to the extreme left end 5a of each internal capacitor electrode 5, while the external output terminal 11 is electrically connected to the extreme right segment 3b of the internal inductor electrode 3 as well as to the extreme right end 6a of each internal capacitor electrode 6. Further, the external ground terminals 12 and 13 are electrically connected to outer ends 4a and 4b of each internal ground electrode 4, respectively.

Figure 3:
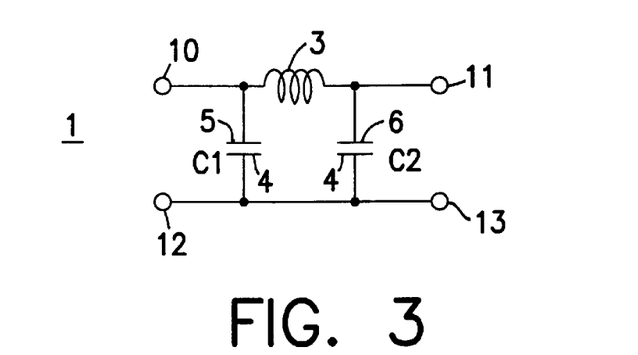
FIG. 3 is an equivalent circuit of the four-terminal, layered capacitor shown in FIG. 2.

The four-terminal, layered capacitor 1 having the above-described structure can be regarded, with reference to its equivalent circuit shown in FIG. 3, as being constructed by separating a single capacitor of the conventional structure (shown in FIG. 10) into a pair of capacitors, that is, a capacitor C1 formed by the internal capacitor electrodes 5 and the internal ground electrodes 4 and a capacitor C2 formed by the internal capacitor electrodes 6 and the internal ground electrodes 4, and then connecting the capacitors C1 and C2 together by means of the internal inductor electrode 3.

Figure 4:
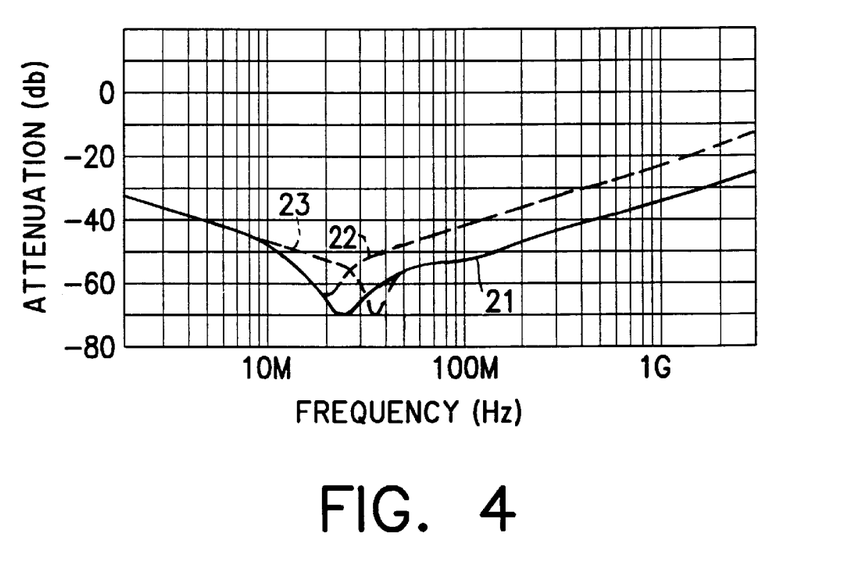
FIG. 4 is a graph representing attenuation characteristics of the four-terminal, layered capacitor of FIG. 2.

A curve (solid line 21) shown in FIG. 4 represents measured attenuation characteristics of the four-terminal, layered capacitor 1, of which the capacitance is 0.15 $\mu$F in this embodiment. FIG. 4 also shows, for comparison, attenuation characteristics of a conventional two-terminal, layered capacitor (dotted line 22) and of a conventional four-terminal, layered capacitor (dotted line 23), both having the same value of capacitance as the four-terminal, layered capacitor 1 of the first embodiment. As can be seen from FIG. 4, the four-terminal, layered capacitor 1 of the first embodiment has a lower resonant frequency than the conventional four-terminal, layered capacitor due to the inductance of the internal inductor electrode 3, and has greater attenuation over a wider frequency range due to the capacitors C1 and C2.

SECOND EMBODIMENT

Figure 5:
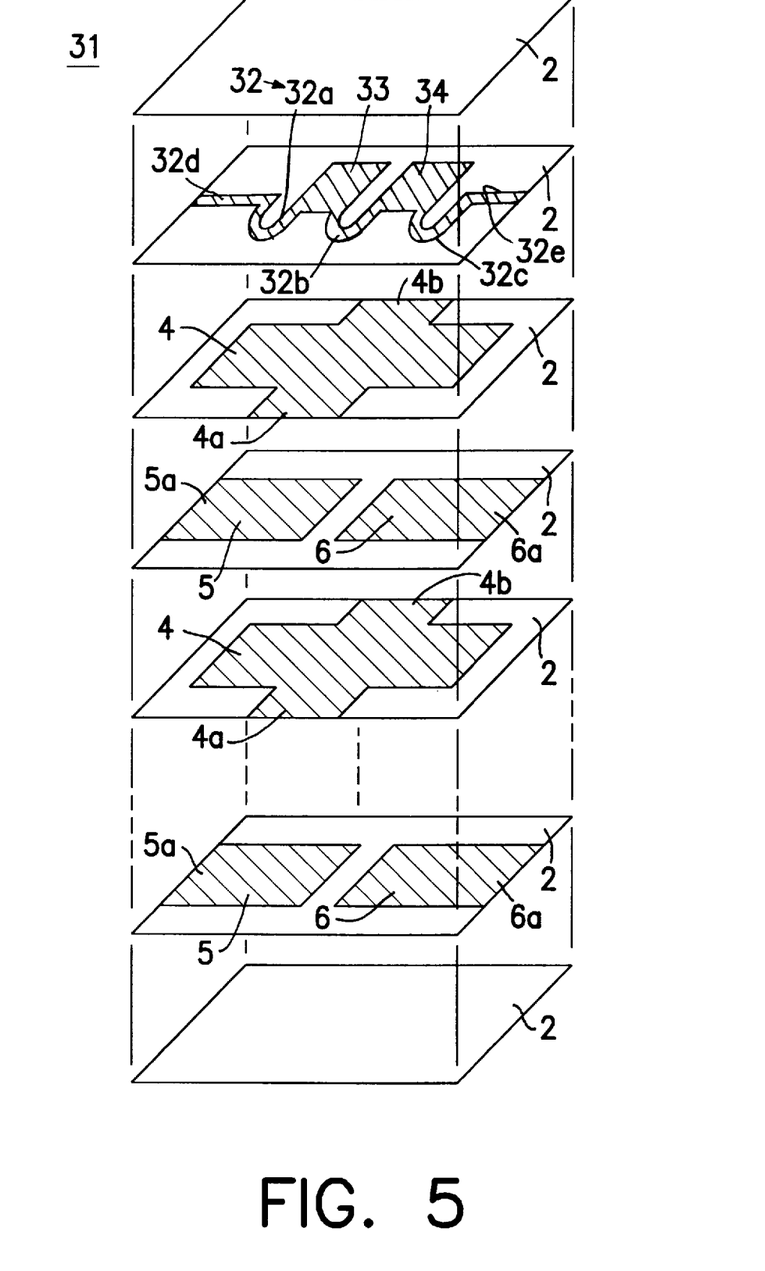
FIG. 5 is an exploded perspective view of a four-terminal, layered capacitor according to a second embodiment of the invention.

As shown in FIG. 5, a four-terminal, layered capacitor 31 of a second embodiment of the invention is the same as the capacitor 1 of the first embodiment except for the structure of an internal inductor electrode 32 which is made up of a series of segments 32a–32e which are formed in series with a pair of internal capacitor electrodes 33 and 34. The internal inductor electrode 32 includes curved segments 32a, 32b and 32c with extreme outer segments 32d and 32e exposed at left and right edges of the dielectric sheet 2, respectively. The internal capacitor electrode 33 is electrically connected between the curved segments 32a and 32b while the internal capacitor electrode 34 is electrically connected between the curved segments 32b and 32c.

Figure 6:
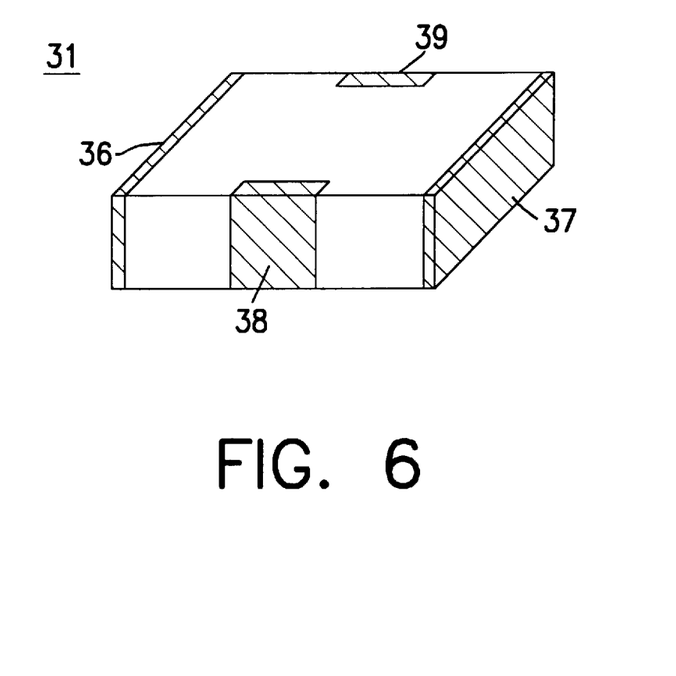
FIG. 6 is a perspective view showing the external appearance of the four-terminal, layered capacitor shown in FIG. 5.

The individual dielectric sheets 2 are stacked in the order shown in FIG. 5, and calcined to form a single laminated body. An external input terminal 36 and external output terminal 37 are formed at left and right end faces of the laminated body while a pair of external ground terminals 38 and 39 are formed at front and rear end faces, respectively, as illustrated in FIG. 6. The external input terminal 36 is electrically connected to the extreme left segment 32d of the internal inductor electrode 3 as well as to the extreme left end 5a of each internal capacitor electrode 5, while the external output terminal 37 is electrically connected to the extreme right segment 32e of the internal inductor electrode 3 as well as to the extreme right end 6a of each internal capacitor electrode 6. Further, the external ground terminals 38 and 39 are electrically connected to outer ends 4a and 4b of each internal ground electrode 4, respectively.

Figure 7:
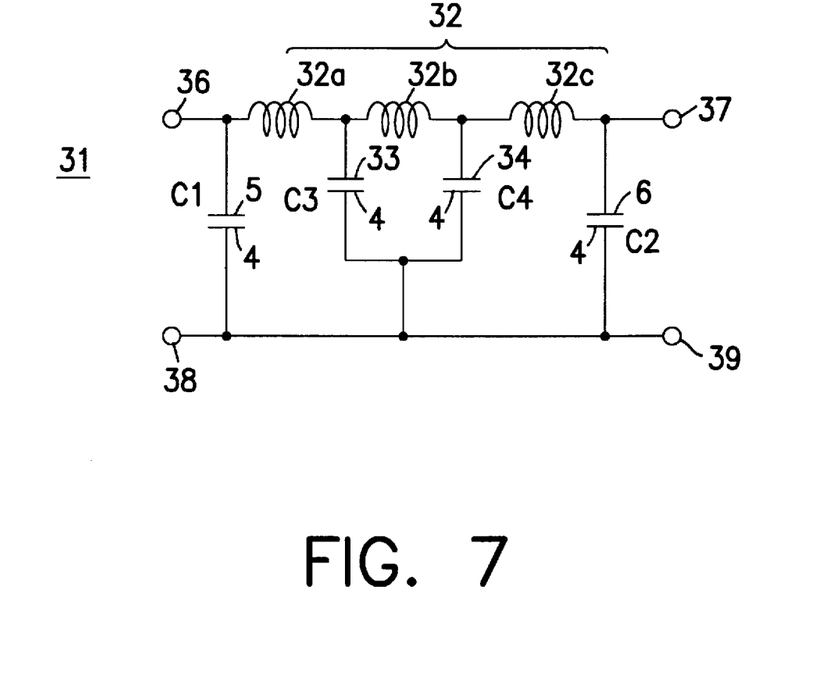
FIG. 7 is an equivalent circuit of the four-terminal, layered capacitor shown in FIG. 6.

The four-terminal, layered capacitor 31 having the above-described structure can be regarded, with reference to its equivalent circuit shown in FIG. 7, as being constructed by separating the single capacitor of the conventional structure (shown in FIG. 10) into a pair of capacitors, that is, a capacitor C1 formed by the internal capacitor electrodes 5 and the internal ground electrodes 4 and a capacitor C2 formed by the internal capacitor electrodes 6 and the internal ground electrodes 4, and then connecting the capacitors C1 and C2 by an LC circuit made up of inductors 32a–32c formed by the internal inductor electrode 32 and capacitors C3 and C4 formed by the internal capacitor electrodes 33, 34 and 4. An advantage of this four-terminal, layered capacitor 31 is that its resonant frequency is even lower than that of the four-terminal, layered capacitor 1 of the first embodiment.

Additional features of the invention are described in further detail with reference to the following third embodiment, in which three distinct capacitor elements are formed in a noise-absorbing, ceramic layered capacitor (hereinafter referred to simply as a ceramic layered capacitor).

THIRD EMBODIMENT

Figure 11:
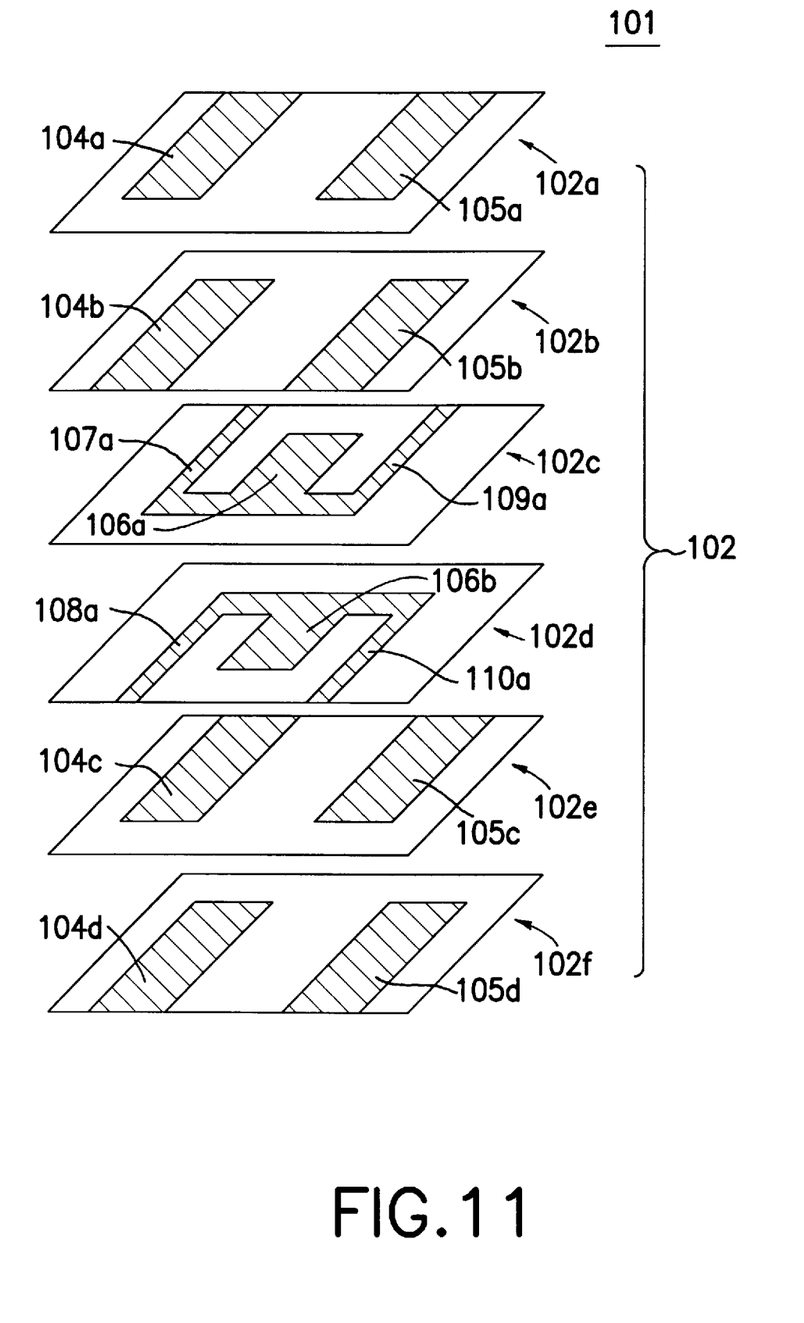
FIG. 11 is an exploded perspective view of a ceramic layered capacitor according to a third embodiment of the invention.
Figure 12:
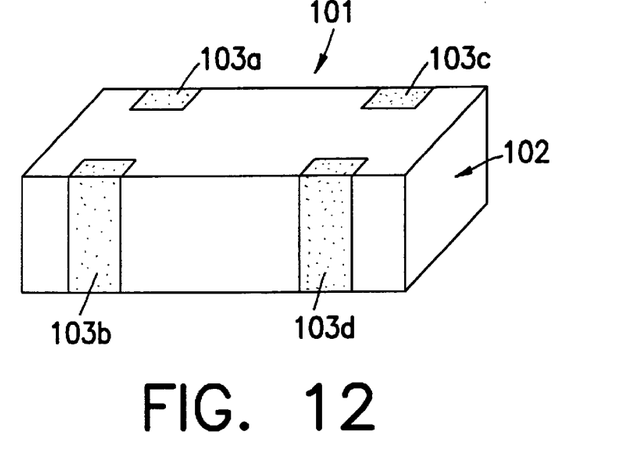
FIG. 12 is a perspective view showing the external appearance of the ceramic layered capacitor of the third embodiment.
Figure 13:
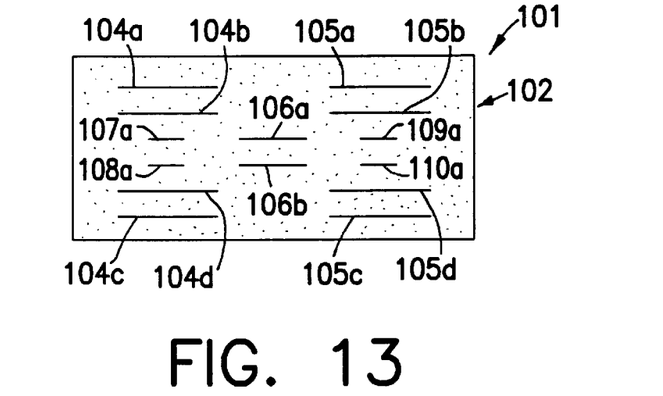
FIG. 13 is a cross-sectional diagram showing an internal electrode arrangement of the ceramic layered capacitor of the third embodiment.
Figure 14:
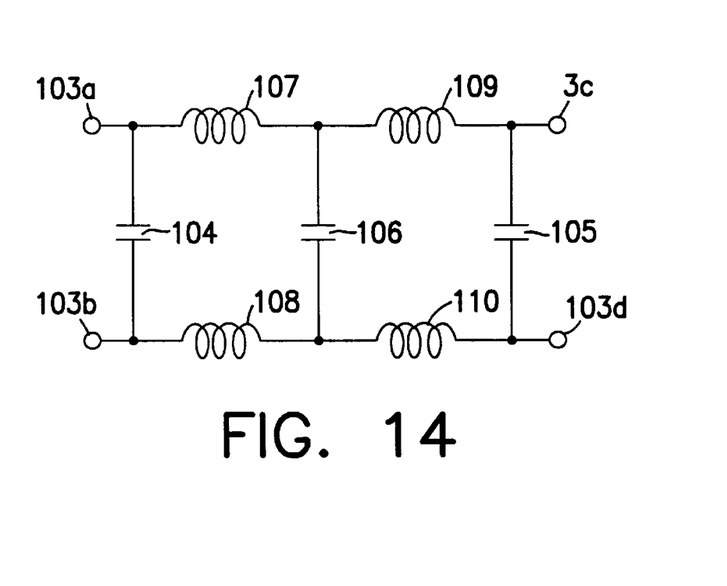
FIG. 14 is an equivalent circuit of the ceramic layered capacitor of the third embodiment.

FIG. 11 is an exploded perspective view showing the construction of a ceramic layered capacitor 101 according to a third embodiment of the invention; FIG. 12 is a perspective view showing the external appearance of the ceramic layered capacitor 101; FIG. 13 is a cross-sectional diagram showing an internal electrode arrangement including capacitor and inductor element patterns of the ceramic layered capacitor 101; and FIG. 14 is an equivalent circuit of the ceramic layered capacitor 101. To facilitate understanding of the internal electrode arrangement, each layer (plane) containing capacitor and/or inductor element patterns is regarded as a distinct ceramic sheet.

As shown in FIGS. 11 and 12, the ceramic layered capacitor 101 comprises a laminated ceramic body 102 formed by stacking a plurality of ceramic sheets 102a to 102f and four external terminals 103a to 103d fitted to outer surfaces of the laminated ceramic body 102. Additional ceramic sheets carrying no electrodes (not shown) are laminated on the top and bottom of the laminated ceramic body 102.

The ceramic layered capacitor 101 contains capacitor element patterns 104a to 104d provided on the ceramic sheets 102a, 102b, 102e and 102f, respectively, to form a capacitor element 104, capacitor element patterns 105a to 105d provided on the same ceramic sheets 102a, 102b, 102e and 102f, respectively, to form a capacitor element 105, and capacitor element patterns 106a and 106b provided on the ceramic sheets 102c and 102d, respectively, to form a capacitor element 106. The individual capacitor element patterns 104a–104d, 105a–105d, 106a and 106b are so arranged that the capacitor elements 104 and 105 have the same value of capacitance and the capacitor element 106 has a smaller value of capacitance compared to the capacitor elements 104 and 105.

The ceramic layered capacitor 101 further contains inductor element patterns 107a to 110a provided on the ceramic sheets 102c and 102d to form four inductor elements 107 to 110 which interconnect the capacitor elements 104, 105 and 106. The individual inductor element patterns 107a to 110a are so arranged that all the inductor elements 107 to 110 have the same inductance.

As can be seen from the equivalent circuit of the ceramic layered capacitor 101 shown in FIG. 14, the capacitor element 106 is connected to the capacitor element 104 by the inductor elements 107 and 108, and the capacitor element 105 is connected to the capacitor element 106 by the inductor elements 109 and 110 to form together a network in which the individual capacitor elements 104 to 106 are connected in parallel with one another by the inductor elements 107 to 110. The external terminals 103a and 103b are connected to both leads of the capacitor element 104 while the external terminals 103c and 103d are connected to both leads of the capacitor element 105 to complete the four-terminal, ceramic layered capacitor 101.

The ceramic layered capacitor 101 is bidirectional in operation because it has a bilaterally symmetric configuration with the capacitor elements 104 and 105 having the same capacitance located at both ends of the device. More specifically, the ceramic layered capacitor 101 may be connected so that the external terminals 103a and 103b act as input terminals and the external terminals 103c and 103d act as output terminals, or the external terminals 103c and 103d act as input terminals and the external terminals 103a and 103b act as output terminals.

Figure 15:
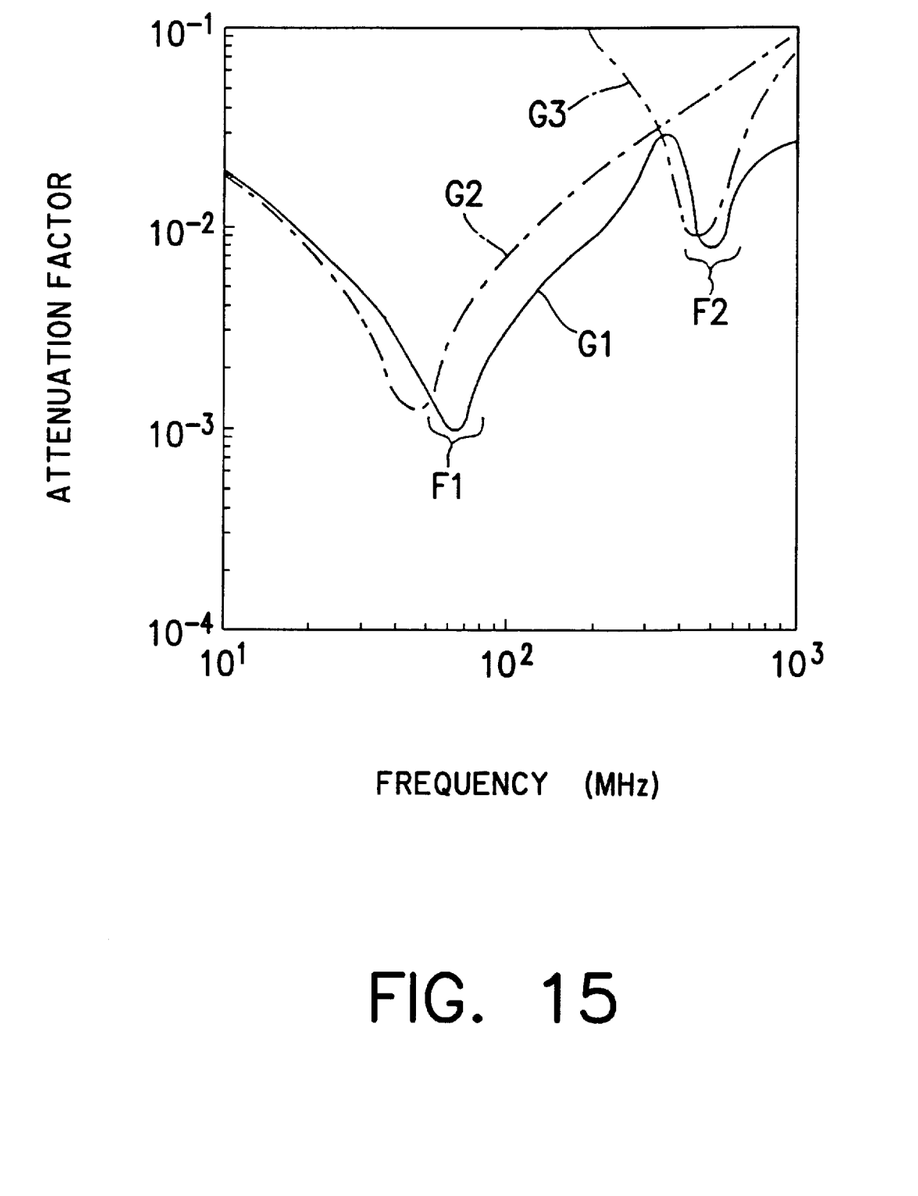
FIG. 15 is a graph representing noise-absorbing characteristics of the ceramic layered capacitor of the third embodiment.

FIG. 15 is a graph representing noise-absorbing characteristics of the ceramic layered capacitor 101 showing a relationship between frequency and attenuation factor. A solid line G1 in the graph shows noise-absorbing characteristics of the whole ceramic layered capacitor 101, an alternate long and short dashed line G2 shows noise-absorbing characteristics of each of the capacitor elements 104 and 105 only, and another alternate long and short dashed line G3 shows noise-absorbing characteristics of the capacitor element 106 only.

It can be seen from FIG. 15 that the ceramic layered capacitor 101 has two prominent attenuation bands F1 and F2. This indicates that the noise-absorbing characteristics of the individual capacitor elements 104, 105 and 106 remain effective in the ceramic layered capacitor 101. According to this embodiment, a single ceramic layered capacitor provides the necessary noise-absorbing performance even when electrical noise is present in two separate frequency ranges.

VARIATIONS OF THE EMBODIMENTS

While the invention has been described in conjunction with embodiments thereof, details of the construction of the above-described multi-terminal, layered capacitors can be varied in various ways.

As an example, a dielectric sheet which acts as a spacer may be inserted between each internal inductor electrode and internal ground electrode in the aforementioned embodiments to eliminate or reduce stray capacitance appearing between the two electrodes.

In another variation, at least one set of internal inductor electrodes and internal ground electrodes is provided at a specific point in the vertical, or stacking, direction of a multi-terminal, layered capacitor for achieving symmetry in electrode arrangement or for adjusting the inductance component of the layered capacitor.

The foregoing discussion of the embodiments is based on the assumption that each multi-terminal, layered capacitor is manufactured singly. In the case of mass production, a plurality of multi-terminal, layered capacitors can be produced at once by making a large substrate having the layer structure as described above and then cutting it into chips of a desired size.

Although the capacitors of the aforementioned embodiments are made by stacking a plurality of dielectric sheets and calcining the stack, the invention is not limited to this construction. In one alternative, the individual dielectric sheets may be calcined before stacking. In another alternative, the layer structure of dielectric sheets and electrodes of each capacitor may be produced by alternately applying and drying pasty dielectric and conductive materials by using a printing technique, for instance.

Figure 16:
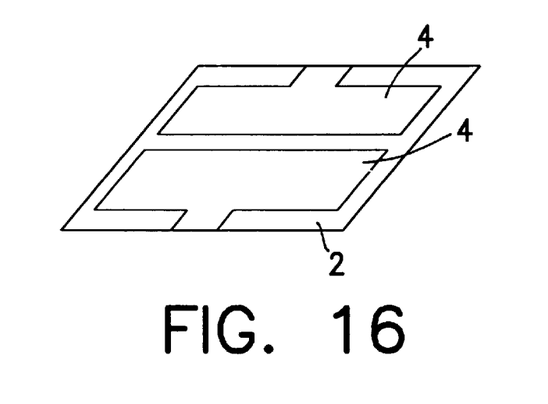
FIG. 16 is a perspective view of an internal ground electrode which is used in a four-terminal, ceramic layered capacitor according to a variation of the invention.

In the first and second embodiments, each of the internal ground electrodes 4 need not necessarily be made of a single electrode element but may be divided into two separate parts as shown in FIG. 16.

Although there are produced three capacitor elements 104, 105 and 106 in the third embodiment described above, the embodiment may be modified to form two capacitor elements, or four or more capacitor elements, interconnected by as many inductor elements as necessary, within the scope of the invention.

The invention is not limited to the aforementioned preferred embodiments and the variations thereof in other respects as well. Shapes and arrangements of the individual capacitor element patterns, inductor element patterns and external terminals may be altered or modified without departing from the spirit and scope of the invention.

What is claimed is:

1. A multi-terminal, layered capacitor with a plurality of dielectric sheets, said dielectric sheets comprising:

an external input terminal;

an external output terminal;

an external ground terminal;

a first internal capacitor electrode electrically connected to said external input terminal;

a second internal capacitor electrode electrically connected to said external output terminal;

an internal ground electrode electrically connected to said external ground terminal, said internal ground electrode producing a capacitance between said first internal capacitor electrode and said internal ground electrode and a second capacitance between said second internal capacitor electrode and said internal ground electrode; and an internal inductor electrode electrically connected between said external input terminal and said external output terminal, wherein said plurality of dielectric sheets are stacked integrally.

2. A four-terminal, layered capacitor with a plurality of dielectric sheets, said dielectric sheets comprising:

an external input terminal;

an external output terminal;

a pair of external ground terminals;

a first internal capacitor electrode electrically connected to said external input terminal;

a second internal capacitor electrode electrically connected to said external output terminal;

an internal ground electrode electrically connected to said pair of external ground terminals, said internal ground electrode producing a capacitance between said first internal capacitor electrode and said internal ground electrode and another capacitance between said second internal capacitor electrode and said internal ground electrode; and an internal inductor electrode electrically connected between said external input terminal and said external output terminal, wherein said plurality of dielectric sheets are stacked integrally.

3. A four-terminal layered capacitor according to claim 2, wherein said internal ground electrode comprises a pair of internal ground electrode members each connected to a respective one of said external ground terminals.

4. A four-terminal, layered capacitor according to claim 2, wherein said internal inductor electrode has a curved segment and a third internal capacitor electrode which forms a third capacitance with said internal ground electrode.

5. A noise-absorbing, ceramic layered capacitor comprising a plurality of internal electrodes embedded in a ceramic body, said internal electrodes including:

capacitor element patterns arranged to form a plurality of capacitor elements having different values of capacitance; and inductor element patterns forming inductor elements which interconnect said capacitor elements in parallel with one another via said inductor elements in a plurality of stages, wherein said ceramic body is formed by stacking a plurality of dielectric sheets.

6. A noise-absorbing, ceramic layered capacitor according to claim 5, further comprising a plurality of external terminals connected to said capacitor elements.

7. A noise-absorbing, ceramic layered capacitor according to claim 6, wherein said capacitor element patterns are arranged in such a way that one of said capacitor elements has a smaller value of capacitance than the remainder thereof.

8. A noise-absorbing, ceramic layered capacitor according to claim 5, wherein said capacitor element patterns are arranged in such a way that one of said capacitor elements has a smaller value of capacitance than the remainder thereof.

* * * * *